3,641,181
MICROEMULSION SEPARATION OF ORGANIC
COMPOUNDS IN LIQUID STATE
Max L. Robbins, South Orange, and Darrell W. Browna-
well, Scotch Plains, N.J., assignors to Esso Research
and Engineering Company
No Drawing. Filed Sept. 10, 1969, Ser. No. 856,829
Int. Cl. C07c 7/10, 7/02; C10g
U.S. Cl. 260—674
7 Claims

ABSTRACT OF THE DISCLOSURE

A process for separating a mixture containing liquid organic compounds, having different interfacial tensions when measured against substantially hydrocarbon-insoluble polar liquids, into its component parts comprises the steps of combining said mixture of organic liquids with surfactants and with a polar liquid substantially immiscible with any of the components of the mixture being separated thereby selectively forming two phases, one being a microemulsion rich in the organic components having the lower interfacial tension, wherein said polar liquid is the continuous phase, and the other being an oil phase rich in the components having the higher interfacial tension with respect to the polar liquid. The two phases are then separated.

BACKGROUND OF THE INVENTION

Field of the invention

This invention relates to a novel process for separating a mixture containing organic compounds in liquid state into its component parts. More particularly, this invention pertains to a liquid phase separation of organic liquids having different interfacial tensions with respect to a polar liquid, using a microemulsifying surfactant combination to promote the selective formation of a microemulsion of the specific organic component with a substantially hydrocarbon-insoluble polar liquid. Separation of the emulsified and non-emulsified organic components can then be effected.

Description of the prior art

A number of techniques are known for separating mixtures of organic compounds into their components. These include fractional distillation, fractional crystallization, extractive distillation, solvent extractions, the use of molecular sieves, etc.

In the past, emulsion formation has been used as a tool to effect the removal of such contaminants as metal oxides, carbon particles, and water from oil; however, heretofore, it has never been suggested that mixtures of mutually miscible organic compounds in liquid state could be separated through the selective formation of the microemulsion.

It is well known that different organic liquids have different interfacial tensions with respect to substantially hydrocarbon-insoluble polar liquids. Similarly, it is well known that said interfacial tension between an organic liquid and a polar liquid substantially immiscible with said organic liquid can be lowered by adding to the system one or more surfactants which concentrate at the interface between the two phases. It has recently been taught that it is possible through the use of a select combination of surfactants to lower interfacial tension to a point at which a clear, stable, microemulsion will form (U.S. Pat. 3,346,494). The key to microemulsion formation is the careful balancing of the surfactant composition to give a zero or negative interfacial tension between the phases. Under these conditions the two phases will spontaneously emulsify to form a clear microemulsion of extremely small droplet size (~100–500 A.).

SUMMARY OF THE INVENTION

In accordance with the present invention, a mixture containing different organic compounds in liquid state, said compounds having different interfacial tensions with respect to a polar liquid substantially immiscible with any of the components of the mixture being separated, can now be separated into its component parts by combining said mixture of organic liquids with (a) a polar liquid substantially immiscible with said mixture, and (b) a surfactant combination, to selectively form, (1) a microemulsion rich in the organic component having the lower interfacial tension wherein said polar liquid is the continuous phase and (2) an oil phase rich in the component having the higher interfacial tension with respect to the polar liquid.

While the microemulsion systems are generally exemplified herein in terms of water as the polar liquid and will be referred to as water-continuous microemulsions, it is to be understood that other polar liquids that are immiscible with the organic liquid being treated can also be used.

The term oil phase is used herein to describe the phase or phases which can be characterized as oil or oil-continuous and which contain the water immiscible organic components of the original water-immiscible organic mixture which exhibit the higher interfacial tensions. Thus it is to be understood that said term is intended to denote those phases which are not water or water-continuous and is therefore intended to also denote the oil-continuous microemulsion which can form wherein the polar liquid will be the disperse phase and the component having the higher interfacial tension will be the continuous phase.

The process of this invention is based on the discovery that if an organic liquid consists of mutually miscible components A and B, which differ appreciably in their interfacial tensions, as measured against a polar phase immiscible with the organic liquid, the interfacial tension can be adjusted so that only one of the components forms a microemulsion wherein the polar liquid is the continuous phase. Thus, it has now been discovered that organic liquids having different interfacial tensions can be separated from each other through the selective use of microemulsifying surfactants to form two phases, one being a water-continuous microemulsion rich in the organic component having the lower interfacial tension and the other being an oil phase rich in the organic component having the higher interfacial tension.

One way of explaining the manner in which the process of this invention can be carried out is in terms of hydrophilic - lipophilic balance. Organic liquids differing appreciably in their interfacial tension versus water, for example, will also differ in their HLB (hydrophilic-lipophilic balance) requirement. This HLB requirement represents the ideal point at which a specific organic liquid will form an emulsion with water.

The HLB requirements for many organic components are already known in the art and a partial listing can be found in The Atlas HLB System, 2nd ed. (revised) Atlas Chemical Industries, Inc., Wilmington, Del. 1963. The HLB requirements of other organic liquids can be calculated by methods known in the art.

Surfactants have been classified according to their HLB value, which represents their suitability as emulsifiers for different oil/water systems having different HLB requirements. The HLB values of many surfactants have been determined and are known in the art, (see: e.g. Kirk Othmer Encyclopedia of Chemical Technology, 2nd ed., vol. 8, pp. 128–130) and the HLB values of other solubilizers can be calculated by various methods described in the available literature. (See, for example, Becher.

Emulsion Theory & Practice, Second Edition (Reinhold Publishing Co. 1957, 1965), chap. 6, pp. 232–266.)

Given the HLB requirements for forming a water-continuous emulsion of the components in an organic mixture, the HLB values of the available surfactants, and the technique of the present invention, it will now be possible for those skilled in the art to choose a surfactant or blend of surfactants matching the HLB requirement of the organic component exhibiting the lower interfacial tension and capable of promoting a microemulsion separation of any mixture containing organic compounds in liquid state having different interfacial tensions when measured against a polar liquid that is insoluble in any of the components of the mixture.

A microemulsion, as herein defined, is a clear or very slightly hazy emulsion having a droplet size of the dispersed phase of less than 500 A. and preferably less than 200 A.

The water-continuous microemulsions of the present invention usually are formed spontaneously upon the combination of an organic liquid, an immiscible polar liquid (usually, but not necessarily, water) and a predetermined combination of microemulsifiers. Thus, the microemulsions can be prepared at ambient temperature, without using heat, and the only mechanical energy that is necessary is that which effects simple mixing of the phases.

While the process of the invention can be carried out at ambient conditions, said conditions are not critical. Limited only by the boiling and freezing points of the reactants, this process can be carried out at elevated or lowered temperature and at superatmospheric or subatmospheric pressures. Consequently, organic components which are solid at ambient temperatures but which liquefy upon heating, can also be separated by carrying out the process of this invention at an elevated temperature provided said components differ sufficiently in their interfacial tension.

In general, a surfactant that is only water-soluble or only hydrocarbon-soluble, will not lower the interfacial tension sufficiently to form a microemulsion. While, in principle, a single surfactant with the correct balance between water solubility and oil solubility could form a satisfactory microemulsion, the amount of organic liquid that can be microemulsified in a normally oil-insoluble polar liquid is increased if a blend of at least two surfactants is used. Furthermore, any desired HLB value can be more exactly produced by carefully blending precalculated amounts of surfactants having known HLB values. Excellent results can be achieved through the use of a combination of two surfactants whose HLB values bracket the HLB requirement of the organic component having the lower interfacial tension, and even finer blending can be achieved when a third or even a fourth surfactant whose HLB value approximates the HLB requirement of said organic component is also used.

Among surfactants there are those which are primarily hydrophilic surfactants, having an HLB (hydrophilic-lipophilic balance) rating of about 15 or higher, those which are primarily lipophilic surfactants, having a hydrophilic-lipophilic balance rating of about 0 to about 10 and amphophilic surfactants having an HLB rating of about 5 to about 20. All three types of surfactants have a hydrocarbon portion to impart solubility in, or affinity for, the organic phase, and a polar portion, e.g., a hydroxy, carboxy, amino, or similar group, to impart solubility in or affinity for the oil-insoluble, polar phase. In general, the proportion of carbon atoms to polar groups will govern whether the surfactant is predominantly hydrophilic or predominantly lipophilic. For example, $C_2$–$C_7$ compounds including carboxylic acids, alcohols, esters, amides, polyols, ethers, amines, amine salts, quaternary amine salts, alkyl phenols, ethoxyethers, sulfur acids, phosphorus acids and thiophosphorus acids of all valences, and $C_2$–$C_7$ compounds containing nitro groups or bifunctional groups, such as amino alcohols, are all primarily hydrophilic, although differences in hydrophilic character will be evidenced depending on the strength of the polar group.

On the other hand, $C_8$–$C_{60}$ compounds including carboxylic acids, alcohols, esters, amides, polyols, ethers, amines, amine salts, quaternary amine salts, alkyl phenols, ethoxyethers, sulfur acids, phosphorus acids, thiophosphorus acids of all valences, and $C_8$–$C_{60}$ compounds containing nitrogroups or bifunctional groups, such as amino alcohol, are primarily lipophilic, although the lipophilic character is modified by the strength of the polar group (e.g., octyl phenol) is primarily lipophilic, but when ethoxylated with more than 5 ethoxy groups, it becomes hydrophilic.

The amphiphilic surfactants are comprised of the same type of compounds as the hydrophilic and the lipophilic surfactants, except that their carbon chains are of an intermediate length, e.g., $C_6$–$C_{24}$.

A particularly effective combination of surfactants for use in one embodiment of this invention comprises a mixture of an amphiphilic fatty acid, a lipophilic alkyl phenol and a hydrophilic alkylene polyamine or alkanol amine. Fatty acids suitable for use in this combination include those having from 12 to 20 carbon atoms. The acid can be saturated, for example, lauric, myristic, arachidic, palmitic or stearic acid, or it can be unsaturated. The preferred acids are those which contain 1 to 3 double bonds, e.g., oleic, linoleic or linolenic acid. Other suitable acids include palmitoleic, alaidic, eleostearic, licanic, hypogenic, ricinoleic, vaccenic, punicic. While these acids may be substituted or unsubstituted, it is preferred that they be unsubstituted. Particularly suitable is a mixture of fatty acids from tall oil.

The amines that are effective include alkylene polyamines having 2 to 4 amino groups and from 1 to 3 carbons per amine group, e.g., diethylene triamine. Alkylene diamines such as ethylene diamine or propylene diamine are preferred.

Even more effective than the alkylene polyamines are certain amino alcohols and preferably mixtures of these amino alcohols. Suitable amino alcohols include primary, secondary and tertiary alkyl amino alcohols containing from 2 to 5 carbon atoms per alkyl group. Suitable amino alcohols include, for example, ethanol amine, pentanol amino, diethanol amine, 2-amino-2-methyl butanol-1, etc. The preferred amino alcohols are the primary, secondary and tertiary isopropanol amines, to wit, monoisopropanol amine, diisopropanol amine, and triisopropanol amine. Economically, mixtures of isopropanol amines are particularly preferred.

The alkyl phenols which can be used in conjunction with the amino compound and fatty acid in this invention include the monohydroxy and polyhydroxy phenols having at least one alkyl group containing from 8 to 12 carbon atoms. The alkyl group, saturated or unsaturated, can be branched or straight chained. The alkyl group and/or the aryl group can be substituted with halogen or the like but they are preferably unsubstituted. Examples of suitable alkyl phenols include octyl phenol, nonyl cresol, 1-propyl-3-dodecyl phenol, 1,3-dimethyl-5-decyl phenol, etc. Economically, a mixture prepared by alkylation of phenol with tripropylene and comprising about 60 to 70% monononyl phenol and about 30 to 40% dinonyl phenol is preferred.

The alkyl phenyl polyethoxy alkanols obtained by reacting 1 to 16 molar proportions of ethylene oxide with one mole of an alkyl phenol having a $C_5$ to $C_{12}$ alkyl group can also be used as surfactants in the present invention. These materials can be either predominantly water soluble or predominantly hydrocarbon soluble or have been balanced hydrocarbon solubility and water solubility, depending on the ratio of the ethylene oxide groups to the alkyl phenol molecule. These materials can be represented by the formula:

$$RO(CH_2CH_2O)_xCH_2CH_2OH$$

where R is the alkyl phenyl group and $x$ is zero to 15.

Examples include the reaction product of 6 moles of ethylene oxide with one mole of dodecyl phenol, the reaction product of 5 moles of propylene oxide and 4 moles of ethylene oxide with one mole of hexyl phenol, and the reaction product of 12 moles of ethylene oxide with 1 mole of nonyl phenol.

Particularly effective for this invention is a mixture of a predominantly hydrocarbon-soluble alkyl phenyl polyalkoxy alkanol, e.g., octyl phenol treated with 1 to 5 moles of ethylene oxide, and a predominantly water-soluble alkyl phenyl polyalkoxy alkanol, e.g., octyl phenol reacted with 7 to 15 moles of ethylene oxide.

The organic liquid subjected to the process of this invention is a mixture containing organic compounds in liquid state. Any combination of organic liquids sufficiently mobile to permit mixing and having a solubility in the polar liquid of less than 10% is suitable as long as the components have sufficiently different interfacial tensions. Usually this separation will be performed on components which differ in interfacial tension with respect to water (IFT) by about 15 dynes or more/cm. in order to assure good results. However, this separation can also be carried out between components having even smaller differences in interfacial tension, e.g., $CCl_4$ (IFT=45.0) in n-octane (IFT=50.8) if the surfactants are very precisely prepared and/or the separated streams are recycled.

Non-limiting examples of suitable organic mixtures which can be separated by the present process include mixtures of aromatic and/or paraffinic hydrocarbons with organic ethers, alcohols, aldehydes, ketones, acids, esters, amides, amines, etc. (e.g. ethyl ether (IFT=10.7) in benzene (IFT=35.0); n-octyl alcohol (IFT=8.5) in heptane (IFT=51); aniline (IFT=5.7) in toluene (IFT=36.1); oleic acid (IFT=17) in n-tetradecane (IFT=52.2); methyl n-propyl ketone (IFT=6.3) in hexane (IFT=50), etc.).

The polar liquid to be used is substantially immiscible with any of the components of the mixture being separated and is determined by the particular application in which the microemulsion is employed. Usually, however, it will be water, water-miscible alcohols, e.g., methanol, glycerol, ethylene glycol, etc., aqueous or water-miscible alcoholic solutions of inorganic salts and bases (oxides and hydroxides) and/or mixtures thereof. Water is particularly preferred in many applications.

The wt. percent of surfactant in polar liquid which is used will depend upon the particular components involved. In general, however, the surfactants will comprise about 1 to 80, preferably 10 to 50 wt. percent of the combination of surfactant and polar liquid.

The wt. percent of organic mixture which can be separated by any given amount of surfactant in polar liquid will also vary with the particular components involved. In some applications, one part by weight of surfactant will not microemulsify more than 3 parts of the organic component exhibiting the lower interfacial tension while in other applications, one part can microemulsify as much as about 10 parts of the organic component. Generally, excess amounts of microemulsifying agents are not used and usually an amount of surfactant equivalent in weight to the organic component to be microemulsified will be used.

As is known in the art, when two or more surfactants are to be blended the HLB of the combination is easily calculated. If $x$ is the proportion of one surfactant having an HLB of A, and the other surfactant has an HLB of B, the HLB of the combination can be expressed for all practical purposes as $xA+(1-x)B$. Since this is a straight-line relationship, it can be computed graphically with the greatest of ease.

By this procedure the many emulsifiers and blends that have HLB numbers different from the required values may be automatically eliminated and only those having the proper HLB number will remain.

A preferred method for selecting surfactants which permits more accurate determination of surfactant concentrations and ratios is the following:

Two surfactants are chosen which bracket the HLB requirement of the organic component having the lower interfacial tension as measured against a polar liquid. The ratios of the two surfactants are then varied at a fixed concentration in oil (e.g. 20 grams of total surfactant in 20 gms. of oil, said oil which is used being the pure organic component exhibiting the lower interfacial tension), and at each given ratio of surfactants, the system is titrated with water and the water uptake is measured. Water uptake vs. ratio of surfactants is then plotted and the ratio at which maximum water uptake occurred is the surfactant ratio which will give the best separation results for said combination of surfactants.

Once the proper surfactant or blend of surfactants has been chosen, then simple titration of said surfactant or blend of surfactants can be run into a mixture containing only the polar liquid and the organic component having the lower interfacial tension (from the mixture of organic component to be separated) to determine the minimum surfactant concentration in polar liquid which will microemulsify the organic component having the lower interfacial tension when measured against the polar liquid. Then, when carrying out a continuous separation process, it is this concentration of surfactant in polar liquid which can be added to the mixture containing the combination of organic components to be separated, although higher concentrations can be used. In this manner, as each drop of surfactant in polar liquid is added, the drop will combine with the organic component having the lower interfacial tension to form microemulsified droplets. Separation of emulsified components will occur because of specific gravity differences, and the separated layers can then be continuously drawn off.

The method of this invention can obviously also be used to separate mixtures containing more than two components as long as each component sufficiently differs in interfacial tension from each other component. For example, if an organic mixture contains components A, B and C having interfacial tension versus water respectively of e.g. 15 dynes/cm., 30 dynes/cm., and 50 dynes/cm., this method could be used to produce a water-continuous microemulsion containing A and an organic layer, i.e. an oil phase containing B+C or a water-continuous microemulsion containing A+B and an organic layer containing just C. In the first case, A in microemulsion could be drawn off and then B+C could be separated from each other by forming a second microemulsion with B and leaving C in the organic layer. Alternatively, in the second case the oil phase containing C could be drawn off and surfactants added which would unbalance the microemulsified system containing both A and B and promote the formation of a new system in which only A would be microemulsified and B would be present in the organic layer.

The layers thus formed, i.e., the microemulsified phase and the organic phase, are readily separable by means known to those skilled in the art. For example, if the layers are formed in a chamber having a petcock at the bottom, the bottom layer can be separately drawn off by merely opening the petcock and allowing the bottom layer to flow out until the interface is reached. Thus, the oil phase containing the organic components having the higher interfacial tension is readily recoverable and separable from the microemulsified phase.

The organic component having the lower interfacial tension, which is the component present in the microemulsified phase, can also be recovered from the microemulsion by means known to those skilled in the art, e.g., chromatographic separations, fractional distillation, etc., which allow separate recovery of each of the components of the microemulsion. The microemulsion can also be broken by the addition of surfactants to unbalance the system. However, this technique is usually not practical in a continuous process in which it is desirable to recover and recycle the original combination of surfactants because of the difficulty in separating these additional surfactants from the original surfactant combination.

When it is desirable to recover the microemulsified organic component and the original combination of surfactants for recycling, and distillation is the technique chosen to achieve this recovery, then the boiling point of the microemulsified component should differ significantly from that of the polar component and the surfactants so that the microemulsified component and the surfactants can be distilled out separately. Of course, other standard techniques of separation recovery can also be used, e.g., chromatographic techniques, etc.

The separation technique of this invention is useful in a multitude of situations. It can be used on middle distillate fuels to remove high price aromatics from low price fuel while at the same time improving the burning properties of the fuel. For example, hexane and benzene, which have close boiling points and which, therefore, cannot be readily separated by fractional distillation, are easily separated by this inventive technique. Similarly, reformate, which has a value of about 8¢/gallon and which is 40 to 60% aromatic, can be treated in accordance with this proposed method to separate out benzene, toluene and xylene which have a value of 25¢/gallon.

Undesirable color bodies, which normally have more conjugated unsaturation than the product in which they are found, will usually have a lower interfacial tension as measured against water than said product and can, therefore, be selectively microemulsified leaving the desired product in much purer form in the oil layer.

The separation process of the invention can be achieved in different ways. The amount of surfactant needed to promote the selective microemulsification can be added all at once (see, e.g., Example 2, infra.) to the organic mixture and the polar liquid, or surfactants having a combined HLB value matching the HLB requirement of the component having the higher interfacial tension and thus capable of microemulsifying the entire organic liquid phase can first be added along with the polar liquid and then an additional amount of surfactant, selected for its ability to unbalance the system and form a new water-continuous microemulsion rich in the component having the lower interfacial tension can be subsequently added, selectively separating one or more of the components out as an oil phase (see, e.g. Example 1).

The following examples which include a preferred embodiment will serve to illustrate the practice of this invention, it being understood that the invention is not limited to those specific examples, which are intended to merely illustrate but a few applications of the separation technique of the present invention.

EXAMPLE 1

100 grams of a middle distillate fuel oil (hereinafter referred to as oil A) containing aromatic and non-aromatic components are combined over a five minute period at ambient conditions, with 4 grams of surfactants (a 4:1:1 wt. ratio of tall oil fatty acids,[1] mixed isopropanol amines,[2] and alkylated phenol[3] and 3.3 grams of water are added. Upon addition of the surfactants, an emulsion is produced. The emulsion is then mixed with 2 milliliters of ethylene-oxide-treated octyl phenol[4] and allowed to settle overnight at room temperature, whereupon three distinct immiscible layers are produced. I.R. spectra of the middle and top layers show the middle organic layer to be rich in aromatics and the top layer to be poor in original material. The bottom layer is water. The three aromatics, compared to the aromatic content of the layers are drawn off separately and the aromatic-rich material and the aromatic-poor material are separately recovered.

EXAMPLE 2

100 grams of oil A are combined at ambient conditions with 2.6 grams tall oil fatty acids[1], 0.7 gram mixed isopropanol amines[2], 0.7 gram alkylated phenol[3], 2 ml. ethylene oxidetreated octyl phenol[4], and 3.3 grams of water. The mixture is vigorously shaken and then allowed to settle overnight, whereupon three layers form. I.R. spectra of the middle and top layers show the middle layer to be rich in aromatics and the top layer to be poor in aromatics. The bottom layer is water.

The following example was performed in order to demonstrate the selectivity of this separation technique. The specific surfactant combination used does not separate benzene from n-heptane but does separate alkylated naphthalene from undesirable color bodies.

EXAMPLE 3

Part A 100 grams of a 50/50 mixture by weight of benzene and n-heptane was mixed with 3.5 grams of a 4:1:2 ratio of tall oil fatty[1] acid: mixed isopropanol amines:[2] alkylated phenol[3] and 3.0 grams of $H_2O$ to form a cream emulsion. To this system was added 2.0 grams mixed isopropanol amine. Two clear layers formed on standing. Each solvent layer had the same ratio of benzene to n-heptane, as determined by ultraviolet spectroscopy. One of the layers was a microemulsion of surfactant and water in the benzene/n-heptane, the other layer contained a small amount of surfactant.

Part B

A liquid commercial dewaxing aid containing undesirable color bodies was then added to the system. This dewaxing aid (hereinafter referred to as D) consisted of a Friedel-Crafts condensation product of one mole of naphthalene and 4 moles of chlorinated paraffin wax. The wax had a melting point of 125° F. and was chlorinated to contain 14.5 wt. percent chlorine. The total system was mixed at ambient conditions and the two layers allowed to form again upon standing overnight. An ultraviolet spectroscopic examination of the two layers showed that the principal component of D with a UV. absorption at 350 m$\mu$ was primarily in the top layer, the layer that was not microemulsified, while the color bodies with a UV. absorption at 283 m$\mu$ were primarily in the bottom layer, the microemulsified layer.

While particular embodiments of this invention are shown in the examples, it will be evident to those skilled in the art that this invention can be used to separate a vast array of organic mixtures and that any surfactant or combination of surfactants which will promote the selective formation of a microemulsion can be used. It is therefore understood that the invention is obviously subject to variation and modifications disclosed above without departing from its broader aspects and, therefore, it is not intended that the invention be limited to the specific modifications which have been given above for the sake of illustration, but only by the appended claims.

---

[1] Tall oil fatty acids refer to a commercially obtained mixture of unsaturated $C_{18}$ fatty acids comprised of about 50% oleic acid, 45% linoleic acid and 5% saturated acids and resins.
[2] Mixed isopropanol amines refer to a commercially obtained mixture of mono, di and tri-isopropanol amines in a 1:1:1 mole ratio.
[3] The alkylated phenol used in all the examples refers to a mixture of monononyl phenol and dinonyl phenol in a weight ratio of about 2:1.
[4] A 70% solution in water of octyl phenol reacted with 16 moles of ethylene oxide per mole of phenol.

Footnotes 1, 2, 3 and 4 same as in Col. 7.

What is claimed is:

1. A process for separating a mixture of liquid organic compounds into component parts, wherein at least one of said components is a hydrocarbon and wherein components of said mixture have interfacial tensions as measured against water that differ from each other by at least 15 dynes per centimeter which includes the steps of:

(a) mixing said mixture with a polar liquid in which said mixture has a solubility of less than 10 percent and with a surfactant that is selected to give a zero or negative interfacial tension between one of said components and said polar liquid, whereby a microemulsion of said last-named component and said polar liquid is formed; and (b) separating said microemulsion from non-emulsified components by gravity difference;

said polar liquid being selected from the class consisting of water and a water-miscible alcohol.

2. Process as defined by claim 1 wherein said polar liquid is water.

3. Process as defined by claim 1 wherein said surfactant comprises a mixture of a primarily hydrophilic surfactant having an HLB rating of at least about 15, a primarily lipophilic surfactant having an HLB rating of about 0 to about 10, and an amphiphilic surfactant having an HLB rating of about 5 to about 20.

4. Process as defined by claim 3 wherein said hydrophilic surfactant is an alkylene polyamine having from 2 to 4 amino groups and from 1 to 3 carbon atoms per amino group.

5. Process as defined by claim 1 wherein said surfactant comprises a mixture of a fatty acid having from about 12 to about 20 carbon atoms, an alkyl amino alcohol having about 2 to 5 alkyl atoms per alkyl group, and an alkyl phenol having at least one alkyl group of from 8 to 12 carbon atoms.

6. Process as defined by claim 1 wherein said surfactant comprises an alkyl phenyl polyethoxy alkanol, wherein the alkyl group has from 5 to 12 carbon atoms.

7. Process as defined by claim 1 wherein said mixture contains normal heptane and benzene.

References Cited
UNITED STATES PATENTS

| | | | |
|---|---|---|---|
| 3,102,100 | 8/1963 | Greenwald | 252—303 |
| 3,389,078 | 6/1968 | Elzinga et al. | 252—303 |

JOHN D. WELSH, Primary Examiner

U.S. Cl. X.R.

260—676; 252—312; 208—308